(12) United States Patent
Pate et al.

(10) Patent No.: US 7,103,896 B2
(45) Date of Patent: Sep. 5, 2006

(54) MECHANISM TO AID OPTICAL BEAM FOCUSING ON OPTICAL DISC

(75) Inventors: Michael A Pate, Corvallis, OR (US); Ronald A. Hellekson, Eugene, OR (US); Peter Guy Howard, Junction City, OR (US); Andrew Koll, Albany, OR (US); Andrew L. Van Brocklin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 397 days.

(21) Appl. No.: 10/339,705

(22) Filed: Jan. 8, 2003

(65) Prior Publication Data

US 2004/0202067 A1   Oct. 14, 2004

(51) Int. Cl.
*G11B 11/00* (2006.01)
(52) U.S. Cl. ........................................ 720/718
(58) Field of Classification Search ............... 720/718, 720/719, 722; 360/114.06, 114.03; 369/112.01; 428/64.4
See application file for complete search history.

(56) References Cited

U.S. PATENT DOCUMENTS 5,034,933 A * 7/1991 Fujisawa et al. ......... 369/13.35
5,721,723 A * 2/1998 Uchimaru et al. .......... 720/669
5,917,802 A   6/1999 Konno
6,167,023 A  12/2000 Davis et al.
6,285,651 B1  9/2001 Boutaghou et al.
6,324,148 B1 * 11/2001 Kaneko et al. ............... 369/94
6,351,449 B1  2/2002 Takemoto et al.
6,411,594 B1 * 6/2002 Yamazaki ................. 369/282
6,656,560 B1 * 12/2003 Yamamoto et al. ........ 428/64.4

FOREIGN PATENT DOCUMENTS

EP       0926673 A2    6/1999
JP       2002203321    7/2002

OTHER PUBLICATIONS

US Patent Application by HP Company; "Integrated CD/DVD Recording And Labeling" HP PD No. 10011728; 86 pages; Filed with USPTO Oct. 11, 2001; U.S. Appl. No. 09/976,877.
PHILIPS press release, Oct. 3, 2003 (p. 2).

* cited by examiner

*Primary Examiner*—William J. Klimowicz
*Assistant Examiner*—Mark Blouin (57) ABSTRACT

An optical disc of one embodiment of the invention is disclosed that includes a first surface, a second surface, an optically writable label area, and an optically writable data area. The first and the second surfaces are oppositely situated to one another. The label area is on one of the first and the second surfaces. The data area is on one of the first and the second surfaces. The mechanism aids proper focusing of an optical beam of an optical disc device on the optically writable label area and on the optically writable data area.

44 Claims, 9 Drawing Sheets

MECHANISM TO AID OPTICAL BEAM FOCUSING ON OPTICAL DISC

BACKGROUND OF THE INVENTION

Computer users employ writable and rewritable optical discs for a variety of different purposes. They may save programs or data to the discs, for archival or distribution purposes. In the case of CD-type discs, users may make music CD's that can be played in audio CD players, or save music data files to the CD's, such as MP3 files, that can be played in special-purpose CD players. For DVD-type discs, users have greater storage capacity available to them than with CD-type discs, and may be able to make video DVD's that can be played in stand-alone DVD players.

Many types of optical discs include a data side and a label side. The data side is where the data is written to, whereas the label side allows the user to label the optical disc. Unfortunately, labeling can be an unprofessional, laborious, and/or expensive process. Markers can be used to write on optical discs, but the results are decidedly unprofessional looking. Special expensive pre-cut labels that can be printed on with inkjet or other types of printers can also be used. However, this is a laborious process: the expensive labels must be carefully aligned on the discs, and so on. Special-purpose printers that print directly on the discs can be used, but such printers are fairly expensive. Silk screening employing one, two, or a higher number of colors can be employed, too, but typically is feasible only for large volumes of discs.

In the patent application entitled "Integrated CD/DVD Recording and Label", filed on Oct. 11, 2001, and assigned Ser. No. 09/976,877, a solution to these difficulties is described, in which a laser is used to label optical discs. For optimal performance, the laser, or other optical beam, is focused differently to label the label sides of the optical discs, as compared to write or read from the data sides of the optical discs.

SUMMARY OF THE INVENTION

An optical disc of one embodiment of the invention includes a first surface, a second surface, an optically writable label area, and an optically writable data area. The first and the second surfaces are oppositely situated to one another. The label area is on one of the first and the second surfaces. The data area is on one of the first and the second surfaces. The mechanism aids proper focusing of an optical beam of an optical disc device on the optically writable label area and on the optically writable data area.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, optical, opto-mechanical, and other changes may be made without departing from the spirit or scope of the present invention. The following detailed description is, therefore, not to be taken in a limiting sense, and the scope of the present invention is defined only by the appended claims.

Overview—Proper Focusing of Optical Beam

Figure 1A:
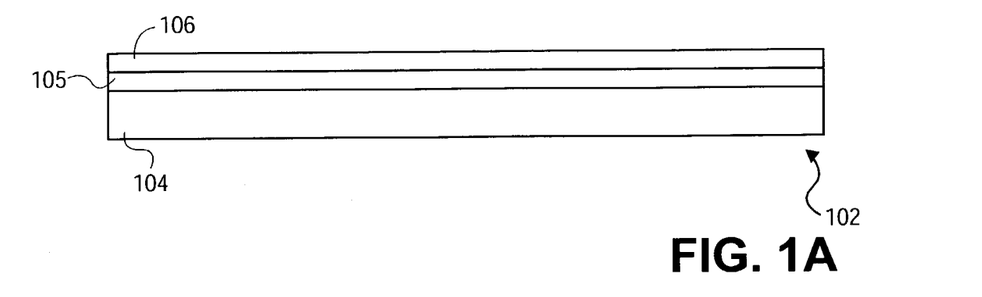
FIG. 1A is a diagram of a representative optical disc, in conjunction with which embodiments of the invention may be utilized.

FIG. 1A shows an optical disc 102 that can be used in accordance with embodiments of the invention. The optical disc 102 may be a compact disc (CD), a digital versatile disc (DVD), or another type of disc, such as a blu-ray optical disc, as known within the art. The optical disc 102 includes an at least substantially transparent substrate 104, on which an optically writable data surface 105 and an optically writable label surface 106 are fabricated. The data surface 105 can be initially fabricated on the transparent substrate 104, by stamping grooves into the substrate 104, and coating the grooves at least with a data-recording material, such as a die, a phase-changeable material, or another type of data-recording material, a type of metal, and a sealing material, such as lacquer. The label surface 106 can then be fabricated over the data surface 105, by using a coating process, such as silk-screening, spin-coating, dip-coating, spray-coating, vacuum-depositing, or another coating process. The optical disc 102 is single-sided, in that there is a single data surface, the data surface 105, and a single label surface, the label surface 106. However, in an alternate embodiment, the optical disc 102 may be double-sided, such that it has two data surfaces and/or data label surfaces. The label surface 106 may be fabricated over all or some of the data surface 105. For instance, in the context of a DVD, the label surface 106 may not completely cover one or both sides of the optical disc 102.

The optical disc 102 may have a thickness of 1200 micron, or 1.2 millimeters (mm), including the thicknesses of the transparent substrate 104, the data surface 105, and the label surface 106. The data surface 105 and the label surface 106 themselves may each have a thickness of 100–300 micron. Therefore, for illustrative clarity, the thicknesses of the surfaces 105 and 106 are not drawn to scale in FIG. 1A, and are indicated larger than they typically actually are. In subsequent figures, however, also for illustrative clarity, the surfaces 105 and 106 are called out as opposite sides of the same outside surface of the transparent substrate 104 of the optical disc 102, and are not depicted as having a thickness, when in actuality they do.

Figure 1B:
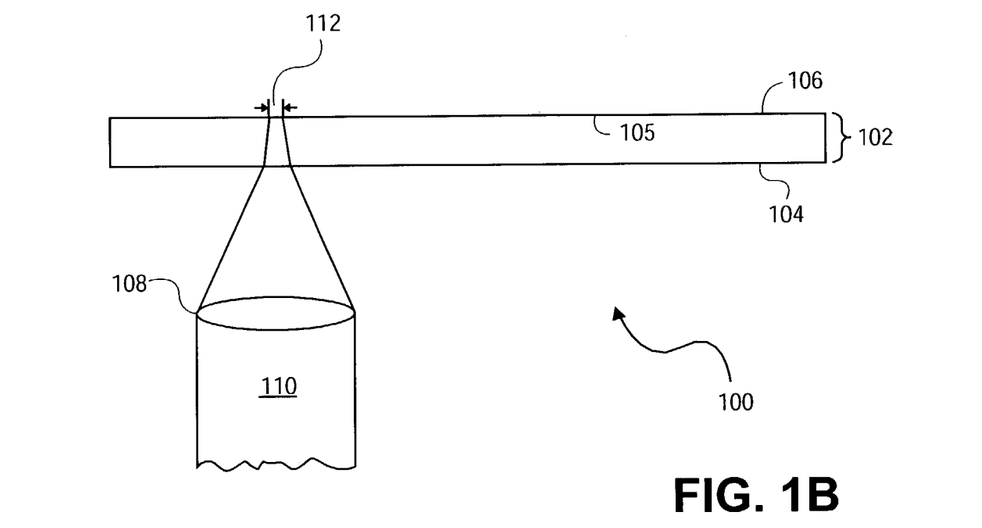
FIGS. 1B and 1C are diagrams showing proper focusing of an optical beam through an objective lens on an optically writable data surface and on an optically writable label surface, respectively, according to an embodiment of the invention.
Figure 1C:
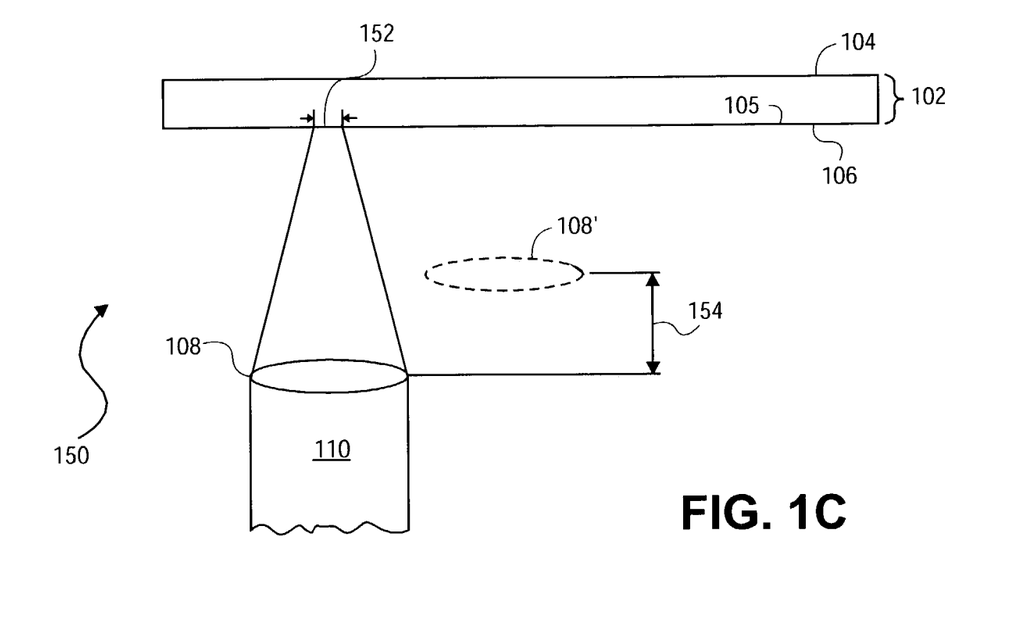

FIGS. 1B and 1C show scenarios 100 and 150, respectively, in which an optical beam 110 is being focused through an objective lens 108 of an optical disc device on the optically writable data surface 105 and the optically writable label surface 106, respectively, of the optical disc 102, according to an embodiment of the invention. In the scenario 100 of FIG. 1B, the optically writable data surface 105 is incident to the optical beam 110 of the optical disc device, which can be a laser. The optical beam 110 is properly focused through the objective lens 108 and through the transparent substrate 104, which refracts the beam 110 to a spot 112 on the data surface 105. The spot 112 can in one embodiment typically have a diameter or ellipse of 2.3 micron, but may have another diameter as well, as can be appreciated by those of ordinary skill within the art, depending on the type of media and the type of wavelength being used. For instance, this dimension may be as specified in the CD Audio Red Book, the CD-ROM and CD-ROM XA Yellow Book, the Video CD White Book, the Enhanced CD Blue Book, the Photo CD Book, and/or the CD-R and CD-RW Orange Book, as available from Philips International B.V., of The Netherlands. Focusing of the beam 110 through the lens 108 enables proper reading from and writing to the data surface 105 of the optical disc 102.

In the scenario 150 of FIG. 1C, the optically writable label surface 106 of the optical disc 102, which is opposite to the optically writable data surface 105 of the disc 102, is incident to the optical beam 110 of the optical disc device. The optical beam 110 is again properly focused through the object lens 108, to a spot 152 on the label surface 106. The spot 152 can in one embodiment typically have a diameter of 42 micron, but may have another diameter as well, as can be appreciated by those of ordinary skill within the art, depending on the type of media and the type of wavelength being used. Such focusing of the beam 110 through the lens 108 enables proper writing to and/or reading from the label surface 106 of the optical disc 102.

For the same objective lens 108 to be utilized in both the scenario 100 of FIG. 1B and the scenario 150 of FIG. 1C, the objective lens 108 is moved away from the optical disc 102 in the scenario 150 as compared to its position in the scenario 100. The position of the objective lens 108 in the scenario 100 of FIG. 1B is depicted for illustrative clarity in the scenario 150 of FIG. 1C by the reference number 108'. Thus, the objective lens 108 is moved from its position in the scenario 100 of FIG. 1B back by a distance 154 in the scenario 150 of FIG. 1C. The distance 154 can in one embodiment typically be 673 micron, but may have another dimension as well, as can be appreciated by those of ordinary skill within the art, depending on the focal length and the numerical aperture of the objective lens 108, the type of media being used, the media's thickness and refractive index, the type of wavelength being used, and the labeling spot size, such as 42 microns as described herein. The distance may also be determined based upon the parameters for spot size that have been described. The position of the objective lens 108 in the scenario 100 enables the lens 108 to properly focus the optical beam 110 relative to the data surface 105, whereas its position in the scenario 150 enables the lens 108 to properly focus the beam 110 relative to the label surface 106.

Optical Disc with Spacer

Figure 2A:
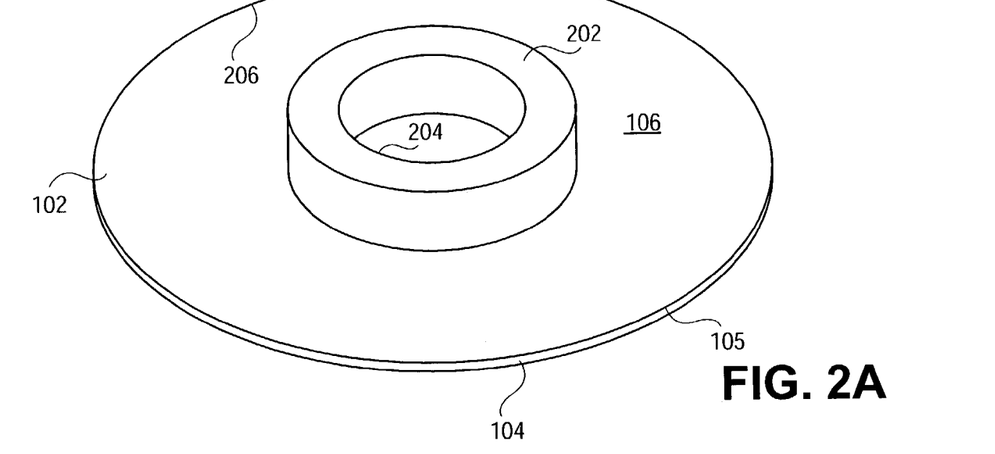
FIGS. 2A, 2B, and 2C are diagrams showing an optical disc having a spacer, according to an embodiment of the invention.
Figure 2B:
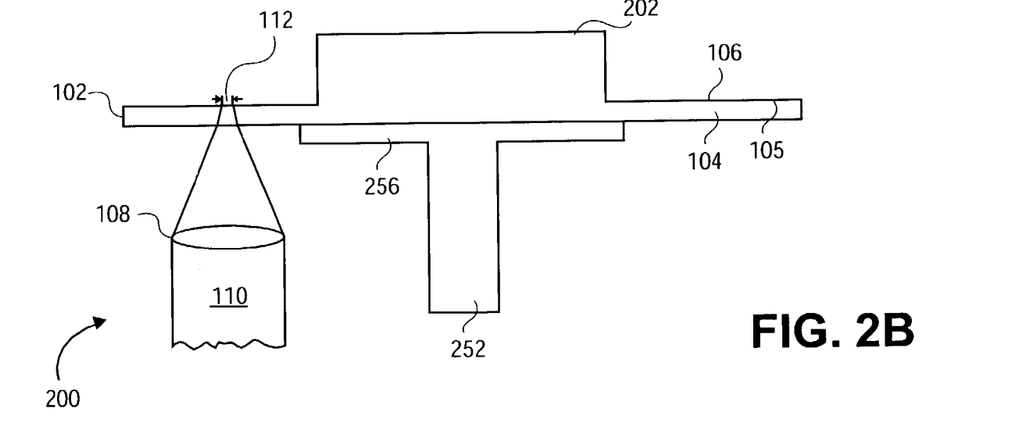
Figure 2C:
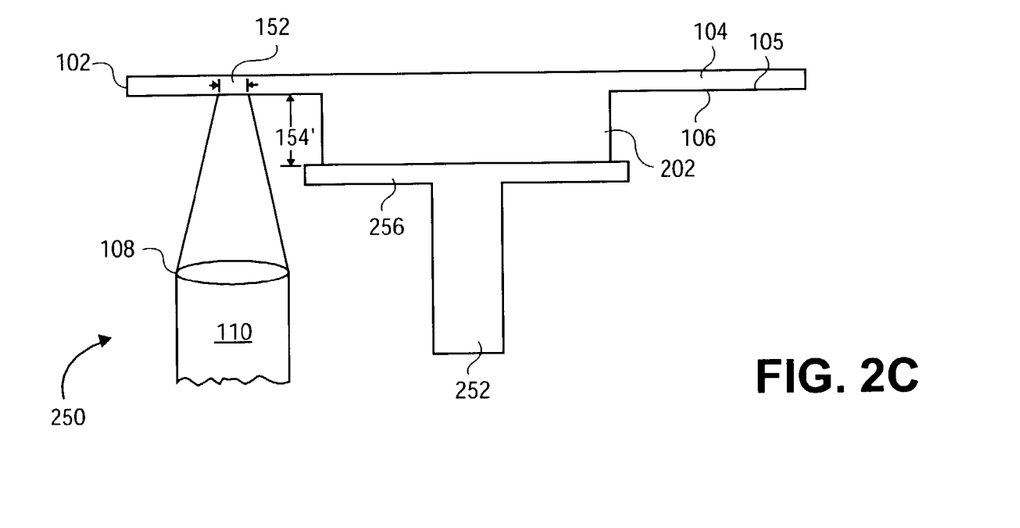

FIGS. 2A, 2B, and 2C show the optical disc 102 with a spacer 202 to effectively distance the objective lens 108 from the optically writable label surface 106 of the disc 102, according to an embodiment of the invention. The spacer 202 in one embodiment may be or may be referred to as a hub. FIG. 2A specifically shows a perspective view of the optical disc 102 with the spacer 202 on the optically writable label surface 106 of the disc 102. The optically writable data surface 105 is on the opposite side of the optically writable label surface 106. The optical disc 102 includes the transparent substrate 104 as before. The spacer 202 is preferably an inner spacer towards or on the inner edge 204 of the optical disc 102, as opposed to the outer edge 206 of the optical disc 102.

FIG. 2B shows a scenario 200 in which the optical disc 102 with the spacer 202 on the label surface 106 is positioned relative to or within an optical disc device for writing to or reading from the data surface 105 of the disc 102. The substrate 104 of the disc 102 rests on a platter 256 of a spindle 252 that rotates, such that the optical beam 110 is incident to the data surface 105. The spacer 202 on the label surface 106 thus does not come into play with the operation of writing to or reading from the data surface 105 of the disc 102. The objective lens 108 is situated so that it normally focuses the beam 110 on the spot 112 on the data surface 105, through the substrate 104 of the disc 102.

Conversely, FIG. 2C shows a scenario 250 in which the optical disc 102 with the spacer 202 on the label surface 106 is positioned relative to or within the optical disc drive for writing to or reading from the label surface 106 of the disc 102. The spacer 202 of the disc 102 rests on the platter 256 of the spindle 252 that rotates, such that the optical beam is incident to the label surface 106. The spacer 202 has a thickness 154', equal to the distance 154 of FIG. 1C that the objective lens 108 should be moved away from its position in FIG. 1B for proper focusing on the spot 152 on the label surface 106 by the optical beam 110. That is, the thickness 154' is calibrated so that it effectively offsets the objective lens 108 away from the label surface 106 by the distance 154 of FIG. 1C, aiding proper focusing on the spot 152 by the beam 110. Thus, even though the objective lens 108 is situated so that it normally focuses the beam 110 on the spot 112 in FIG. 2A, the presence of the spacer 202 ensures that the lens 108 properly focuses the beam 110 on the spot 152 in FIG. 2B.

Figure 3A:
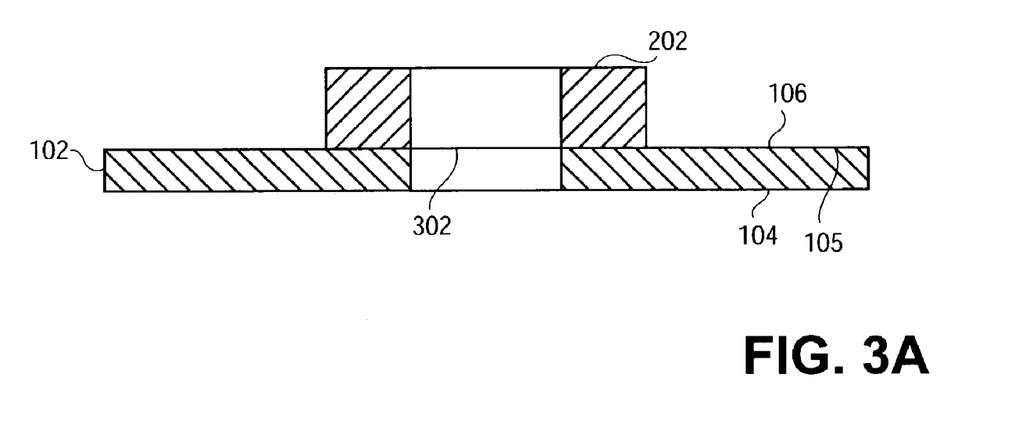
FIGS. 3A and 3B are diagrams showing different ways by which a spacer can be part of an optical disc, according to differing embodiments of the invention.
Figure 3B:
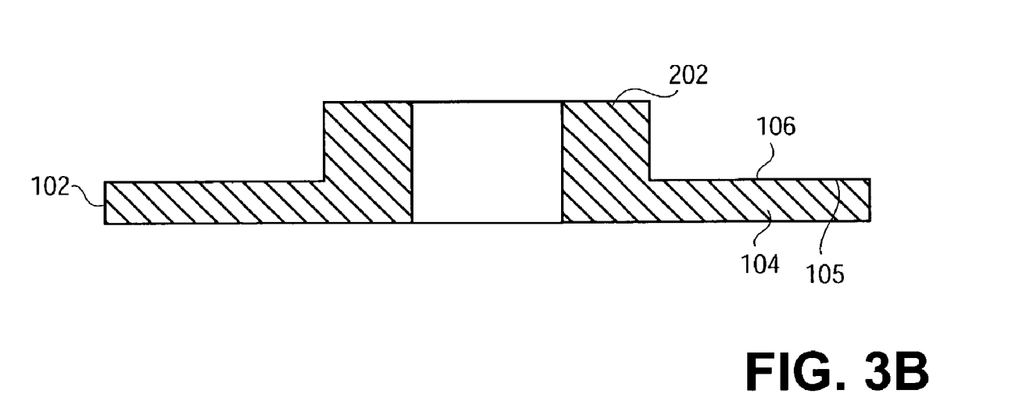

FIGS. 3A and 3B show differing ways by which the spacer 202 can be part of the optical disc 102 on the optically writable label surface 106 thereof, according to differing embodiments of the invention. In FIG. 3A, the spacer 202 is a different part than that of the optical disc 102, as indicated by the line 302 that separates the spacer 202 from the label surface 106 of the optical disc 102. The spacer 202 may thus be fabricated at a different time and/or out of a different material than the optical disc 102, and is at least substantially permanently affixed to the optical disc 102, such as by using an adhesive or another manner. By comparison, in FIG. 3B, the spacer 202 is an integral part of the optical disc 102, such that the spacer 202 is formed during fabrication of the optical disc 102, preferably out of the same material as the disc 102.

Figure 4:
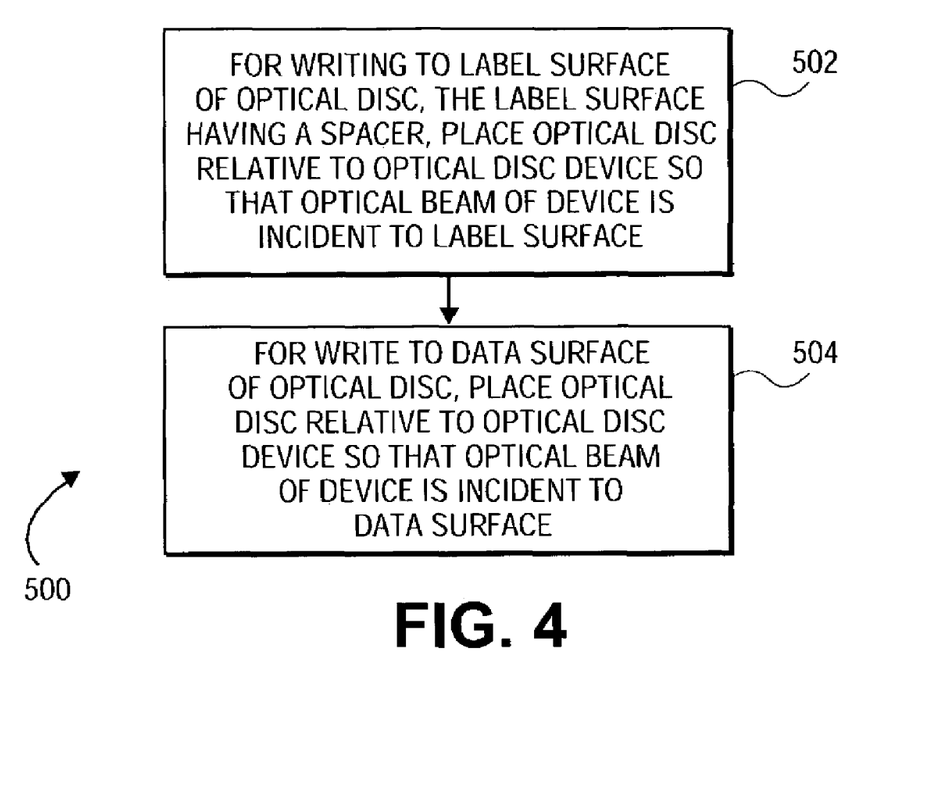
FIG. 4 is a flowchart of a method of use, according to an embodiment of the invention.
Figure 5:
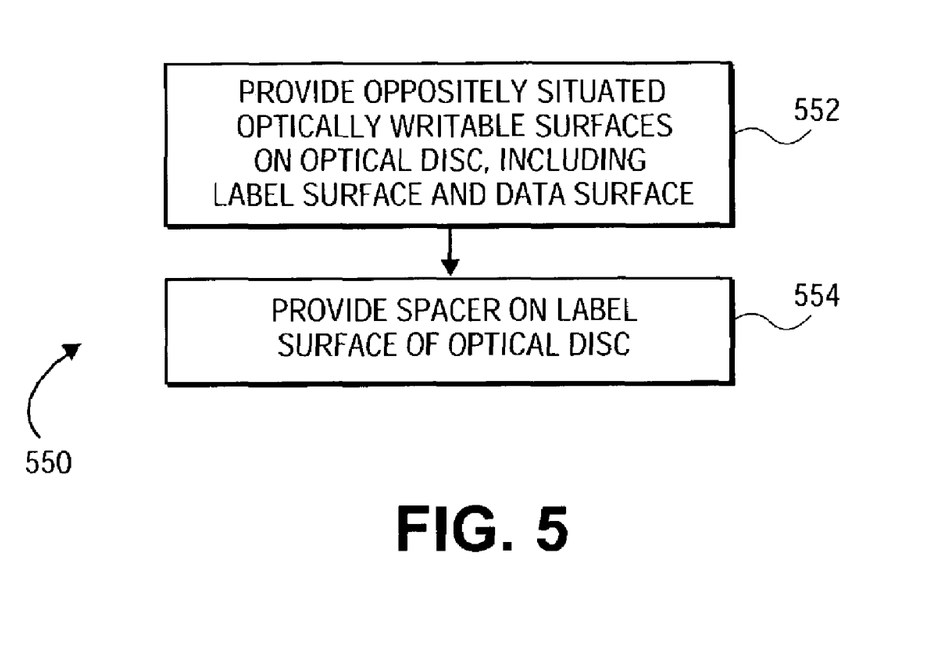
FIG. 5 is a flowchart of a method of manufacture, according to an embodiment of the invention.

FIGS. 4 and 5 show methods according to different embodiments of the invention. The method 500 of FIG. 4 is a method of use that can be performed relative to the optical disc 102 that has been described as having a spacer 202 on the optically writable label surface 106 thereof. For writing to the label surface 106, the optical disc 102 is placed relative to an optical disc device so that the optical beam 110 thereof is incident to the label surface 106 (502). Because the label surface 106 has the spacer 202, this effectively offsets the objective lens 108 of the optical disc device, as depicted in FIG. 2C. For writing to the optically writable data surface 105 of the optical disc 102, the optical disc 102 is placed relative to the optical disc device so that the optical beam 110 thereof is incident to the data surface 105 (504). Because the data surface 105 does not have the spacer 202, the objective lens 108 is not offset, as depicted in FIG. 2B.

The method 550 of FIG. 5 is a method for manufacturing the optical disc 102 that has been described as having a spacer 202 on the optically writable label surface 106 thereof. First, oppositely situated optically writable surfaces are provided on the optical disc 102 (552), including the label surface 106 and the optically writable data surface 105. The spacer 202 is provided on the label surface 106 of the optical disc 102 (554). For instance, the spacer 202 may be fabricated as an integral part of the optical disc 102, as in FIG. 3B, or it may be fabricated as a separate part of the optical disc 102 and permanently affixed thereto, as in FIG. 3A.

The spacer 202 that has been described in this section of the detailed description is advantageous at least because it provides for minimum or no impact on the internal hardware of the optical disc device. That is, utilizing the spacer 202 to adjust the distance between the objective lens 108 and the optical disc 102 may not require that the optical disc device itself, in which the optical disc 102 is to be utilized, be modified. Thus, existing optical disc device hardware, such as existing optical pickup units (OPU's), and so on, may be utilized with the optical disc 102 having the spacer 202.

Optical Disc Device and Spacer for Optical Disc Device

Figure 6A:
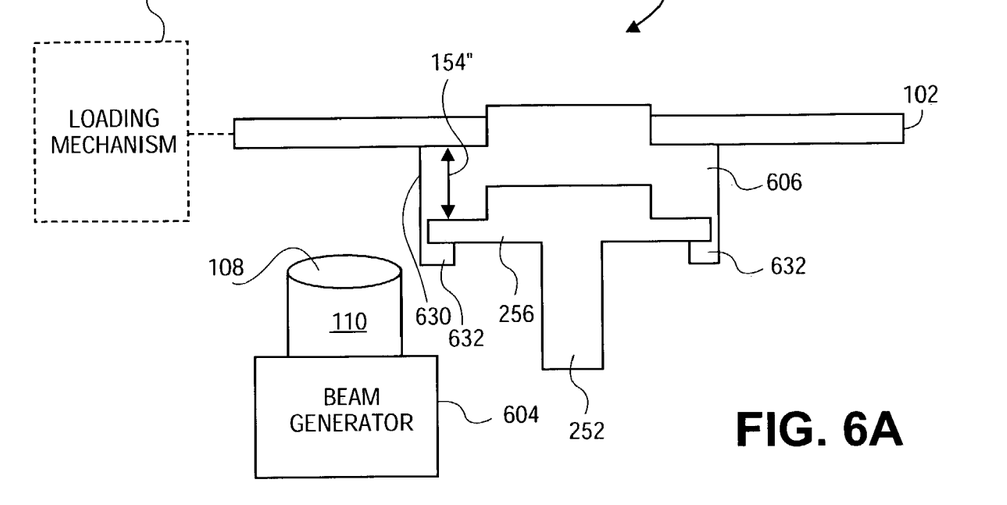
FIGS. 6A, 6B, and 6C are diagrams of an optical disc device having a spacer, according to an embodiment of the invention.
Figure 6B:
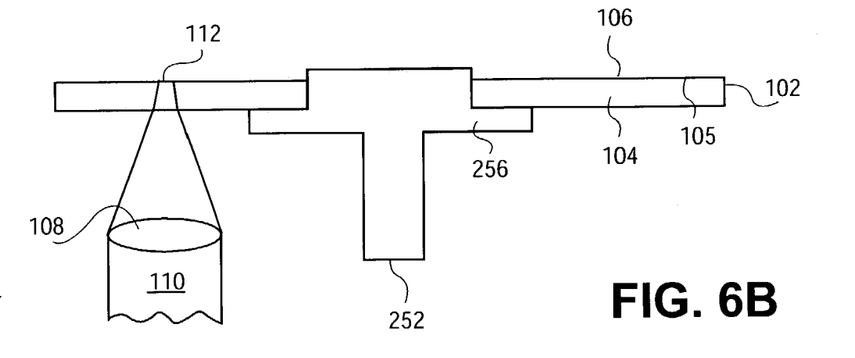
Figure 6C:
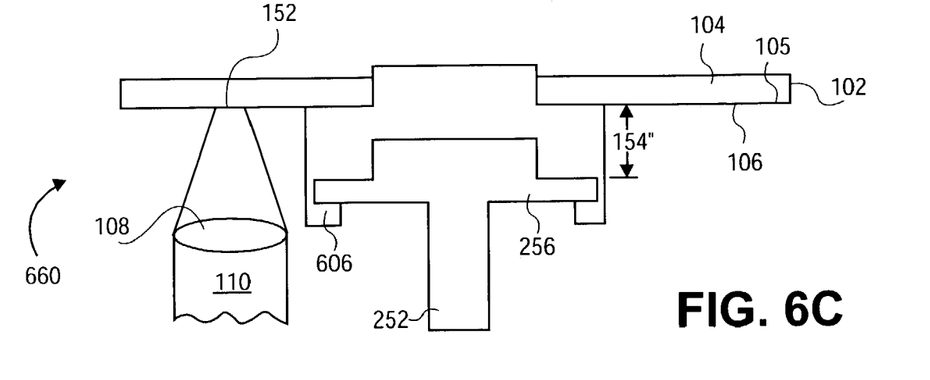

FIGS. 6A, 6B, and 6C show an optical disc device 600 that includes a removable spacer 606 to effectively distance the objective lens 108 of the device 600 from the optically writable label surface 106 of the optical disc 102, according to an embodiment of the invention. FIG. 6A shows the optical disc device 600 in detail. The optical disc device 600 includes a loading mechanism 602 to load the optical disc 102 onto the platter 256 of the spindle 252, which then rotates. The loading mechanism 602 may be, for instance, a tray, or a feeding and an ejecting mechanism. A beam generator 604 generates the optical beam 110 that is focused by the objective lens 108 onto the optical disc 102. The optical disc device 600 may also include other mechanisms not depicted in FIG. 6A, as can be appreciated by those of ordinary skill within the art. For instance, the device 600 may include a tilt mechanism for the spindle 252, a sled mechanism, an optical pick-up unit (OPU), and so on.

The spacer 606 is removable, and is depicted as being removably attachable to the platter 256 of the spindle 252. Furthermore, the spacer 606 has a mechanism 632, such as a snapping mechanism, that enables the spacer 606 to be removably placed within the optical disc device 600, such as snapped on the platter 256 of the spindle 252 as specifically indicated. The spacer 606 has a thickness 154" that is due to a part 630 of the spacer 606. The spacer 606 is specifically used in the embodiment of FIGS. 6A, 6B, and 6C when the optically writable label surface 106 of the disc 102 is incident to the beam 110, as opposed to when the optically writable data surface 105 is incident to the beam 110, as is now described.

FIG. 6B depicts a scenario 640 in which the optical disc device 600 is used to write to or read from the optically writable data surface 105. The spacer 606 is not present in the scenario 640. Rather, the optical disc 102 rests on the platter 256 without the spacer 606. Thus, the spindle 252 rotates, and the objective lens 108 focuses the optical beam 110 onto the spot 112, in accordance with the scenario 200 of FIG. 2B that has been described. The objective lens 108 is situated so that it normally focuses the beam 110 on the spot 112 on the data surface 105, through the substrate 104 of the disc 102.

Conversely, FIG. 6C shows a scenario 660 in which the optical disc device 600 is used to write to the optically writable label surface 106, which is the currently in-use surface of the disc 102 in the scenario 660. The spacer 606 is removably attached to the platter 256 of the spindle 252, such that the label surface 106 rests on the spacer 606, where the spindle 252 rotates. The spacer 606 has a thickness 154" that corresponds to the distance 154 of FIG. 1C by which the objective lens 108 is to be offset from the optical disc 102 to permit proper focusing of the beam 110 on the spot 152 on the surface 106 of the disc 102.

That is, the thickness 154" of the spacer 606 is calibrated so that it effectively offsets the objective lens 108 away from the label surface 106 by the distance 154 of FIG. 1C, aiding proper focusing on the spot 152 by the beam 110. Thus, the objective lens 108 is situated so that it normally focuses the beam 110 on the spot 112 in FIG. 6B. However, the presence of the spacer 606 ensures that the lens properly focuses the beam 110 on the spot 152 in FIG. 6C.

Figure 7A:
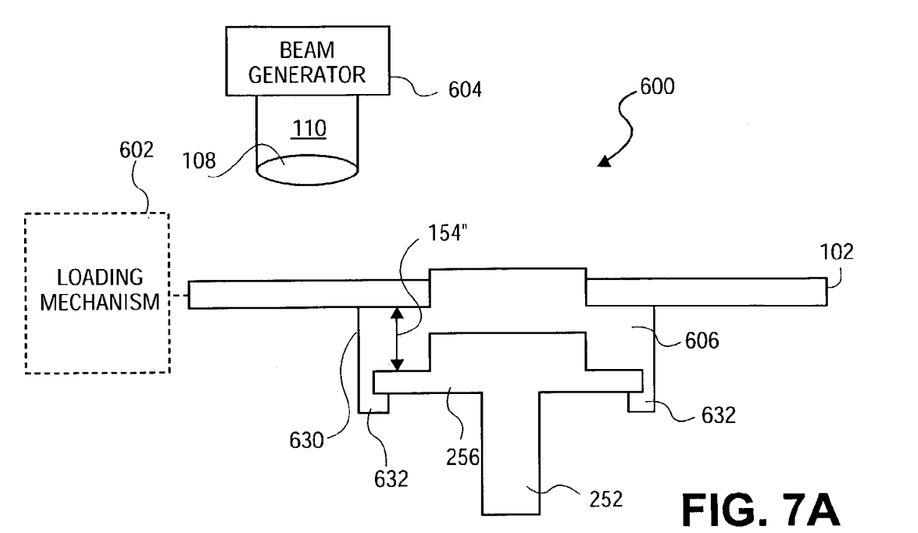
FIGS. 7A, 7B, and 7C are diagrams of an optical disc device having a spacer, according to another embodiment of the invention.
Figure 7B:
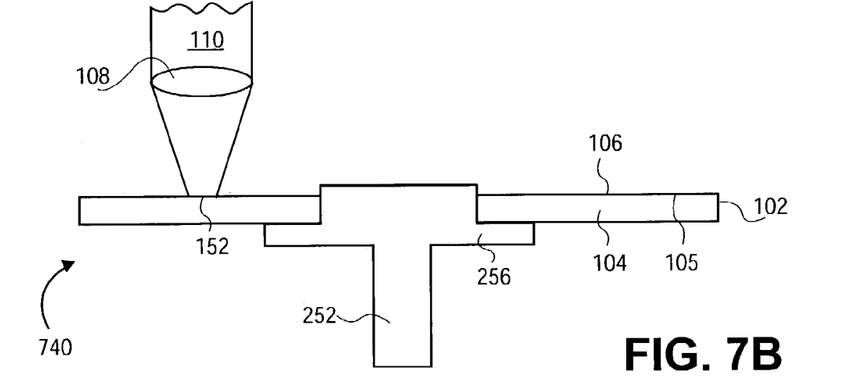
Figure 7C:
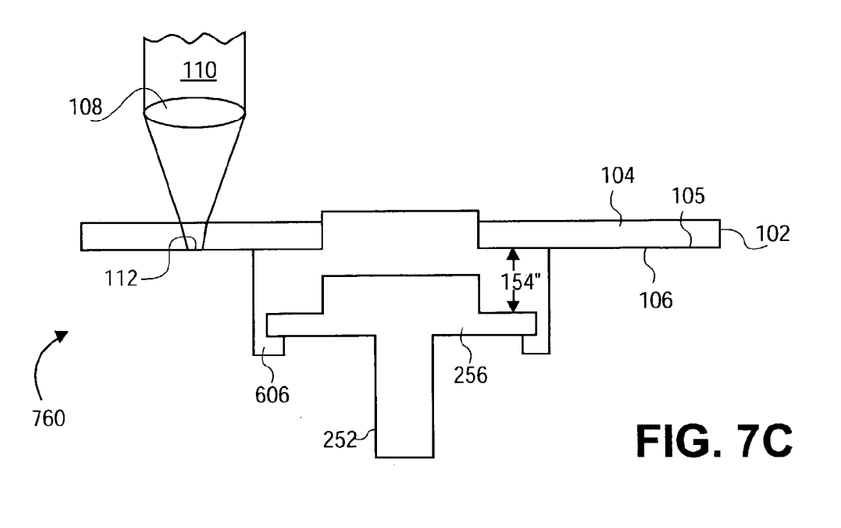

The optical disc device 600 is depicted in FIGS. 6A, 6B, and 6C as having the spindle 252, and thus the spacer 606, on the same side of the optical disc 102 as the optical beam 110. However, in another embodiment of the invention, the spindle 252, and thus the spacer 606, are on the opposite side of the optical disc 102 as compared to the optical beam 110. This is shown in FIGS. 7A, 7B, and 7C, which show the optical disc device 600 including the removable spacer 606 to effectively distance the objective lens 108 of the device 600 towards the optically writable data surface 105 of the optical disc 102, according to an embodiment FIG. 7A shows the optical disc device 600 in detail, according to this embodiment. The device 600 again includes a loading mechanism 602 to load the disc 102 onto the platter 256 of the spindle 252, which rotates. The beam generator 604 generates the optical beam 110 that is focused by the objective lens 108 onto the optical disc 102. While the spacer 606 remains removable, it is specifically used in the embodiments of FIGS. 7A, 7B, and 7C when the optically writable data surface 105 is incident to the beam 110, as opposed to when the optically writable label surface 106 is incident to the beam 110, as is now described.

FIG. 7B depicts a scenario 740 in which the optical disc device 600 is used to write to the optically writable label surface 106. The spacer 606 is not present in the scenario 740, but rather the label surface 106 of the optical disc 102 rests on the platter 256 without the spacer 606. The spindle 252 rotates, and the objective lens 108 focuses the optical beam 110 onto the spot 152. The objective lens 108 is situated so that it normally focuses the beam 110 on the spot 152 on the label surface 106 of the disc 102.

Conversely, FIG. 7C shows a scenario 760 in which the optical disc device 600 is used to write to or read from the optically writable data surface 105, which is the currently in-use surface of the disc 102 in the scenario 660. The spacer 606 is removably attached to the platter 256 of the spindle 252, such that the optical disc 102 rests on the spacer 606, where the spindle 252 rotates. The spacer 606 still has the thickness 154", which serves to offset the objective lens 108 closer by the distance 154 of FIG. 1C to the data surface 105.

That is, because the beam 110 and the objective lens 108 are on the opposite side of the disc 102 as compared to the spindle 252, the spacer 606 acts to bring the disc 102 closer to the lens 108, and not farther away from the lens 108, as in the scenario 660 of FIG. 660. The thickness 154" of the spacer 606 is calibrated so that it effectively offsets the objective lens 108 closer to the data surface 105 by the distance 154 of FIG. 1C, aiding and permitting proper focusing of the beam 110 on the spot 112 on the data surface 105, through the substrate 104. Thus, even though the objective lines 108 is situated so that it normally focuses the beam 110 on the spot 152 of FIG. 7B, the presence of the spacer 606 ensures that the lens properly focuses the beam 110 on the spot 112 in FIG. 7C.

The spacer 606 that has been described in this section of the detailed description is advantageous at least because it provides for minimum or no impact on the internal hardware of the optical disc device 600. That is, utilizing the spacer 606 to adjust the distance between the objective lens 108 and the optical disc 102 may not require that the optical disc device 600 itself be modified. Thus, existing optical disc device hardware, such as existing optical pickup units (OPU's), and so on, may be utilized with the spacer 606.

Optical Disc Device with Movement Mechanism

The embodiments of FIGS. 6A, 6B, and 6C, and of FIGS. 7A, 7B, and 7C, utilize the spacer 606 to effectively distance the objective lens 108 of the optical device 600 away or towards the optical disc 102. In the embodiment of FIGS. 6A, 6B, and 6C, the spacer 606 is utilized when writing to and/or reading from the label surface 106 of the disc 102. Conversely, in the embodiment of FIGS. 7A, 7B, and 7C, the spacer 606 is utilized when writing to and/or reading from the data surface 105 of the disc 102. However, in another embodiment of the invention, the spindle 252 and/or the platter 256 can themselves move, to effectively distance the objective lens 108 of the optical device 600 away or towards the optical disc 102. This means that the spacer 606 is not necessary in this embodiment of the invention.

Figure 8A:
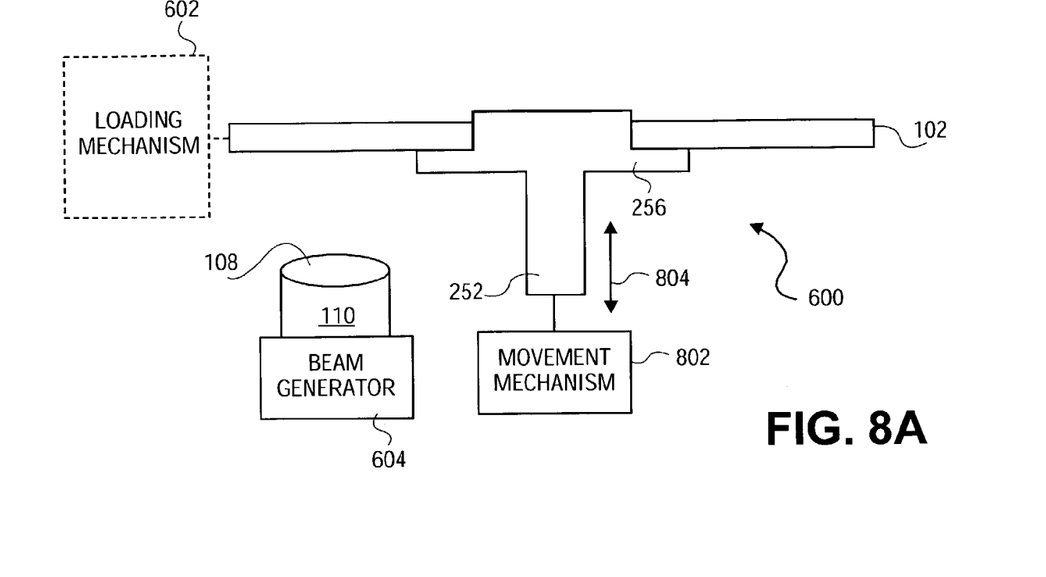
FIGS. 8A, 8B, and 8C are diagrams of an optical disc device having a movable spindle and/or platter, according to an embodiment of the invention.

FIG. 8A shows the optical disc device 600 in detail, according to this embodiment. The device 600 again includes the loading mechanism 602, and the beam generator 604 that generates the optical beam 110 focused by the objective lens 108 onto the optical disc 102. However, the spindle 252 is able to move up and down, as indicated by the bidirectional arrow 804, via a movement mechanism 802. This means that the platter 256, and the optical disc 102 that rests thereon, also moves up and down, and thus away from or towards the objective lens 108. The movement mechanism 802 may be a piston, a motor, a cam operated by the loading mechanism 602, or another type of mechanism that can move the spindle 252, and thus the platter 256.

Whereas the objective lens 108 is depicted in FIG. 8A on the bottom side of the optical disc 102, as in the embodiment of FIGS. 6A, 6B, and 6C, in another embodiment of the invention it may be located on the top side of the optical disc 102, as in the embodiment of FIGS. 7A, 7B, and 7C. Furthermore, the optical disc device 600 may include other mechanisms besides those depicted in FIG. 8A, as before. For instance, the device 600 may include a media-detection mechanism, which detects the type of the surface that is incident to the optical beam, such as the label surface 106 or the data surface 105, so that the movement mechanism 802 accordingly moves the spindle 252 and the platter 256 for the beam 110 to properly focus on the surface that is incident to the beam 110.

Figure 8B:
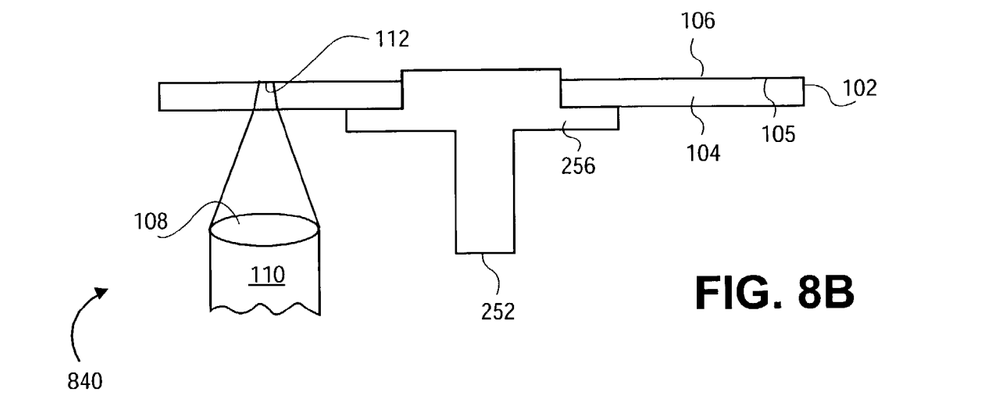

FIG. 8B depicts a scenario 840 in which the optical disc device 600 is used to write to the optically writable data surface 105. As before, the spindle 252 rotates, and the objective lens 108 focuses the optical beam 110 through the substrate 104 of the optical disc 102, onto the spot 112 on the data surface 105. The position of the spindle 252 and the platter 256 are situated so that the objective lens 108 focuses the beam 110 on the spot 112 on the data surface 105 of the disc 102. That is, the movement mechanism 802 of FIG. 8A has moved the spindle 252 and thus the platter 256 to a first positional configuration such that the optical disc 102, and specifically the data surface 105 thereof, is properly positioned relative to the objective lens 108 to focus the beam 110 on the spot 112.

Figure 8C:
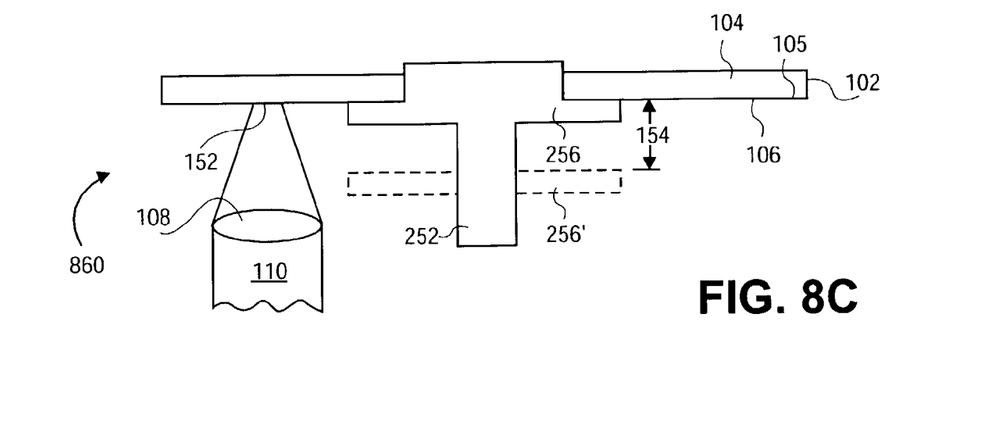

By comparison, FIG. 8C depicts a scenario 860 in which the optical disc device 600 is used to write to the optically writable label surface 106. The spindle 252 rotates, and the objective lens 108 focuses the optical beam 110 onto the spot 152 on the label surface 106 of the optical disc 102. The position of the spindle 252 and the platter 256 are situated so that the objective lens 108 focuses the beam 110 on the spot 152 on the label surface 106. The movement mechanism 802 of FIG. 8A has moved the spindle 252 and thus the platter 256 to a second positional configuration such that the optical disc 102, and specifically the label surface 106 thereof, is properly positioned relative to the objective lens 108 to focus the beam 110 on the spot 152.

The second positional configuration of the spindle 252 and the platter 256 in FIG. 8C is such that the objective lens 108 is farther away from the optical disc 102 as compared to in the first positional configuration in FIG. 8B. The position of the platter 256 in FIG. 8B is indicated in FIG. 8C by the dotted lines called out by the reference number 256'. Thus, the platter 256, and hence the optical disc 102, is located farther away from the objective lens 108 in the second positional configuration in FIG. 8C by the distance 154, as compared to the first positional configuration in FIG. 8B.

Figures 9A, 9B:
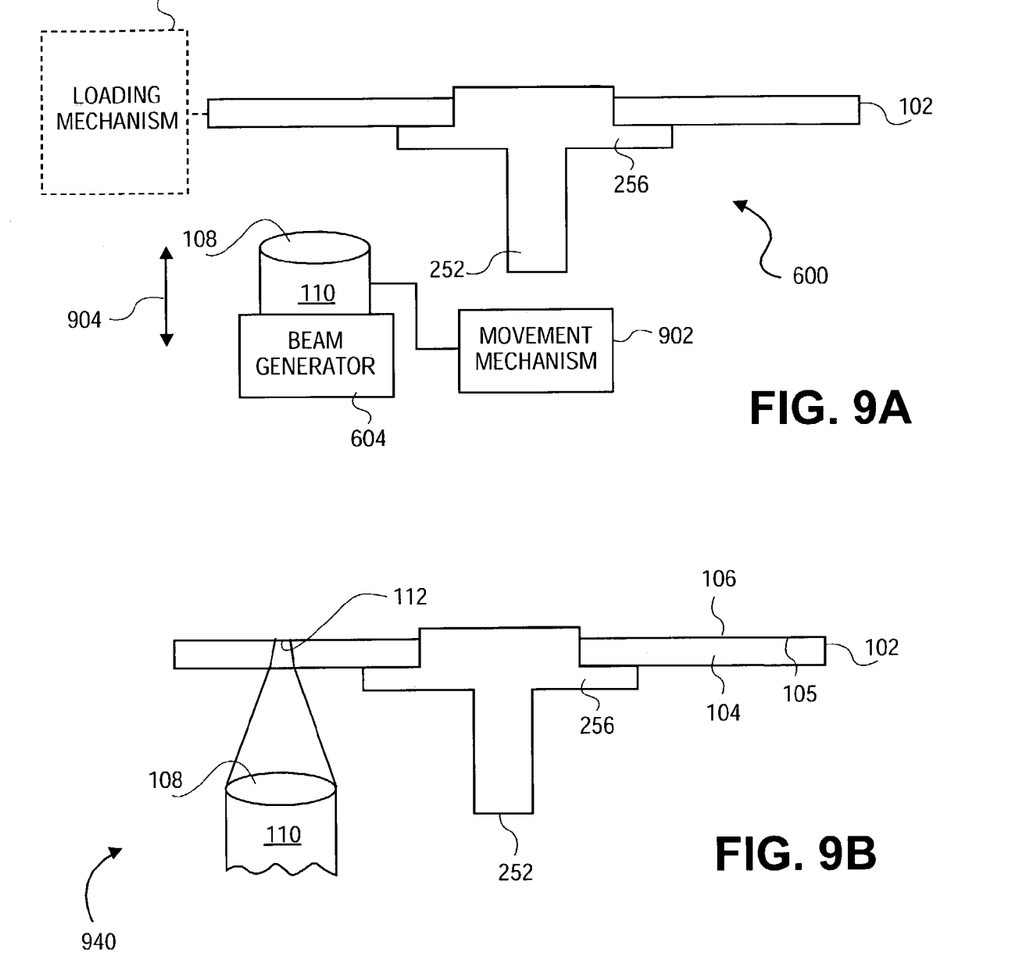
FIGS. 9A, 9B, and 9C are diagrams of an optical disc device having a movable objective lens, according to an embodiment of the invention.

The embodiments of FIGS. 8A, 8B, and 8C utilize the movement mechanism 802 coupled to the spindle 252 to effectively distance the objective lens 108 of the optical device 600 away or towards the optical disc 102. However, in another embodiment of the invention, the objective lens 108 can itself move, to effectively distance the objective lens 108 of the optical device 600 away or towards the optical disc 102. FIG. 9A shows the optical disc device 600 in detail, according to this embodiment. The device 600 again includes the loading mechanism 602, and the beam generator 604 that generates the optical beam 110 focused by the objective lens 108 onto the optical disc 102.

However, the objective lens 108 is able to move up and down, as indicated by the bidirectional arrow 904, via a movement mechanism 902. The movement mechanism 902 may be a piston, a motor, an electromagnetic coil, or another type of mechanism that can move the objective lens 108. For example, in one particular embodiment, an optical pickup unit (OPU) assembly that may include the objective lens 108 and/or the beam generator 604 can be coupled to the movement mechanism 902, such that the OPU assembly, and hence the lens 108, moves up and down. In another particular embodiment, rails on which the OPU assembly is mounted can be coupled to the movement mechanism 902, such that the lens 108 moves up and down.

Whereas the objective lens 108 is depicted in FIG. 9A on the bottom side of the optical disc 102, as in the embodiment of FIGS. 6A, 6B, and 6C, in another embodiment of the invention it may be located on the top side of the optical disc 102, as in the embodiment of FIGS. 7A, 7B, and 7C. Furthermore, the optical disc device 600 may include other mechanisms besides those depicted in FIG. 9A, as before. For instance, the device 600 may include a media-detection mechanism, which detects the type of the surface that is incident to the optical beam, such as the label surface 106 or the data surface 105, so that the movement mechanism 902 accordingly moves the objective lens 108 for the beam 110 to properly focus on the surface that is incident to the beam 110.

FIG. 9B depicts a scenario 940 in which the optical disc device 600 is used to write to the optically writable data surface 105. As before, the spindle 252 rotates, and the objective lens 108 focuses the optical beam 110 through the substrate 104 of the optical disc 102, onto the spot 112 on the data surface 105. The position of the objective lens 108 is such that it focuses the beam 110 on the spot 112 on the data surface 105 of the disc 102. That is, the movement mechanism 902 of FIG. 9A has moved the objective lens 108 to a first positional configuration such that the optical disc 102, and specifically the data surface 105 thereof, is properly positioned relative to the objective lens 108 to focus the beam 110 on the spot 112.

Figure 9C:
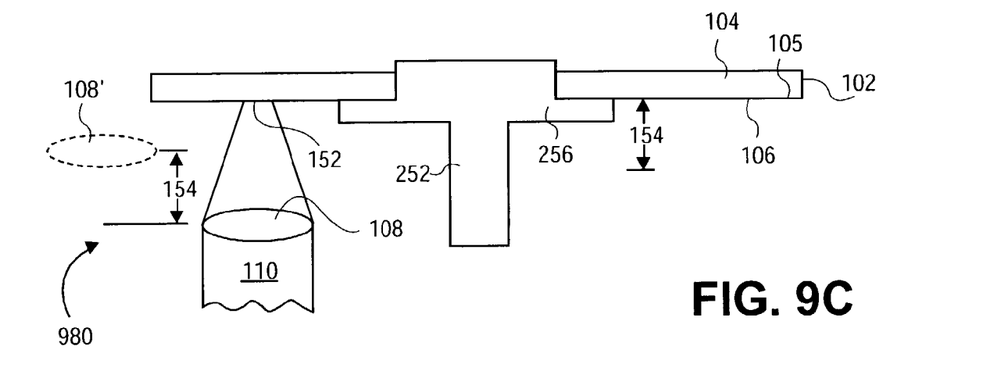

By comparison, FIG. 9C depicts a scenario 980 in which the optical disc device 600 is used to write to the optically writable label surface 106. The spindle 252 rotates, and the objective lens 108 focuses the optical beam 110 onto the spot 152 on the label surface 106 of the optical disc 102. The position of the objective lens 108 is situated so that it focuses the beam 110 on the spot 152 on the label surface 106. The movement mechanism 902 of FIG. 9A has moved the objective lens 108 to a second positional configuration such that the optical disc 102, and specifically the label surface 106 thereof, is properly positioned relative to the objective lens 108 to focus the beam 110 on the spot 152.

The second positional configuration of the objective lens 108 in FIG. 9C is such that the objective lens 108 is farther away from the optical disc 102 as compared to in the first positional configuration in FIG. 9B. The position of the objective lens 108 in FIG. 9B is indicated in FIG. 8C by the dotted lines called out by the reference number 108'. Thus, the optical disc 102 is located farther away from the objective lens 108 in the second positional configuration in FIG. 9C by the distance 154, as compared to the first positional configuration in FIG. 9B.

SUMMATION AND CONCLUSION

Figure 10:
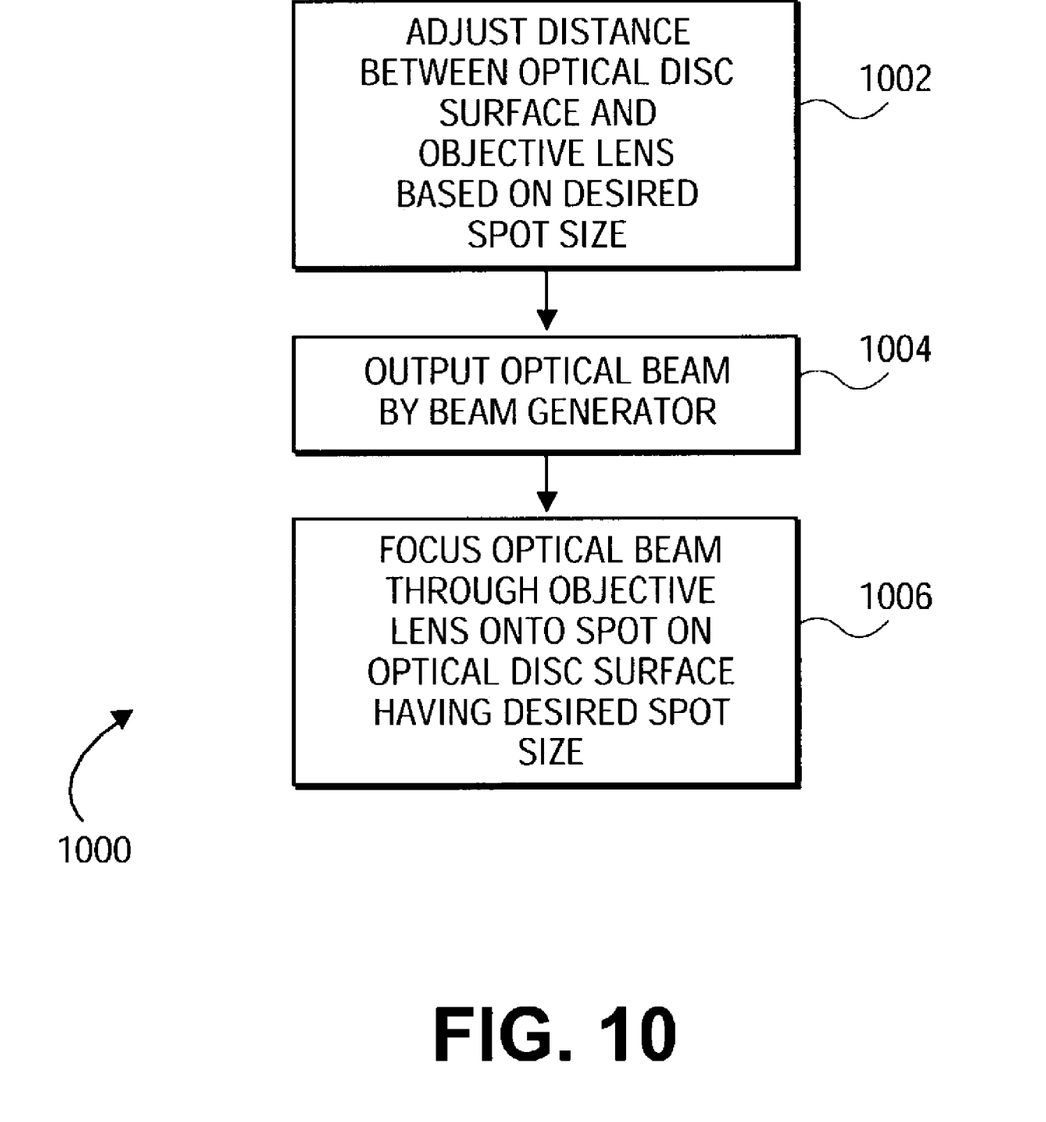
FIG. 10 is a flowchart of a method, according to an embodiment of the invention.

FIG. 10 shows a method 1000, according to an embodiment of the invention, which summarizes the embodiments of the invention that have been described in the previous sections of the detailed description. First, the distance between a surface of the optical disc 102 and the objective lens 108 is adjusted (1002), in accordance with a desired spot size at which the optical beam 110 is to focus on the surface. The surface may be the optically writable label surface 106, the optically writable data surface 105, and so on. The distance may be adjusted in accordance with any of the embodiments of the invention that have already been described, as well as in accordance with other approaches.

For instance, the optical disc 102 may have the spacer 202, as has been described in conjunction with the embodiments of FIGS. 2A, 2B, and 2C. The spindle 252 may have the spacer 606, as has been described in conjunction with the embodiments of FIGS. 6A, 6B, and 6C, and the embodiments of FIGS. 7A, 7B, and 7C. The spindle 252 may be coupled to the movement mechanism 802 to move the spindle 252, as has been described in conjunction with the embodiments of FIGS. 8A, 8B, and 8C. The objective lens 108 may also be coupled to the mechanism 902 to move the objective lens 108, as has been described in conjunction with the embodiments of FIGS. 9A, 9B, and 9C.

The optical beam 110 is then output by the beam generator 604 (1004). The optical beam 110 thus focuses through the objective lens 108 onto a spot on the surface of the optical disc (1006). Because of the adjustment made to the distance between the surface of the optical disc 102 and the objective lens 108, the optical beam 110 focuses at this spot with the desired spot size.

It is noted that, although specific embodiments have been illustrated and described herein, it will be appreciated by those of ordinary skill in the art that any arrangement that is calculated to achieve the same purpose may be substituted for the specific embodiments shown. Other applications and uses of embodiments of the invention, besides those described herein, are amenable to at least some embodiments. This application is intended to cover any adaptations or variations of the present invention. Therefore, it is manifestly intended that this invention be limited only by the claims and equivalents thereof.

We claim:

1. An optical disc device comprising:
a first surface and a second surface oppositely situated to one another, the first surface adapted to be written to with an optical beam without the beam passing through the second surface, and the second surface adapted to be written to with the optical beam without the beam passing through the first surface;
an optically writable label area on one of the first and the second surfaces,
an optically writable data area on one of the first and the second surfaces; and,
a mechanism to aid proper focusing of the optical beam of an optical disc device on the optically writable label area and on the optically writable data area, the mechanism externally exposed at one of the first and the second surfaces when the optical beam is writing to the optical disc.

2. The optical disc of claim 1, wherein the mechanism comprises a spacer fixably attached to the optical disc on one of the first surface and the second surface.

3. The optical disc of claim 1, wherein the mechanism comprises a removable spacer for the optical disc device.

4. An optical disc device comprising:
a first optically writable surface;
a second optically writable surface opposite the first surface, the first surface adapted to be written to with an optical beam without the beam passing through the second surface, and the second surface adapted to be written to with the optical beam without the beam passing through the first surface; and, a spacer on the first surface to aid proper focusing of the optical beam of an optical disc device on the first surface, the spacer externally exposed at the first surface when the optical beam is writing to the first surface.

5. The optical disc of claim 4, wherein the first optically writable surface at least substantially comprises an optically writable label surface, and the second optically writable surface substantially comprises an optically writable data surface.

6. The optical disc of claim 5, wherein the optical beam of the optical disc device is normally focused on the optically writable data surface and the spacer permits the optical beam to properly focus on the optically writable label surface.

7. The optical disc of claim 4, wherein the spacer has a thickness calibrated to aid proper focusing of the optical beam of the optical disc device on the first surface.

8. The optical disc of claim 7, wherein the spacer effectively offsets an objective lens of the optical disc device through which the optical beam is focused by a distance equal to the thickness of the spacer.

9. The optical disc of claim 4, wherein the spacer is at least substantially permanently affixed to the first surface.

10. The optical disc of claim 9, wherein the spacer is separate from the first surface.

11. The optical disc of claim 4, wherein the spacer is removably attached to the first surface.

12. The optical disc of claim 11, wherein the spacer is snapably attached to the first surface.

13. The optical disc of claim 4, wherein the spacer comprises an inside spacer substantially situated on an inner edge of the first surface.

14. The optical disc of claim 4, wherein the optical disc is a type of compact disc (CD).

15. The optical disc of claim 4, wherein the optical disc is a type of digital versatile disc (DVD).

16. The optical disc of claim 4, wherein the optical disc is a type of blu-ray optical disc.

17. The optical disc of claim 4, wherein the optical disc is double-sided.

18. An optical disc device comprising:

a first optically writable surface having at least one label area;

a second optically writable surface, the first surface adapted to be written to with an optical beam without the beam passing through the second surface, and the second surface adapted to be written to with the optical beam without the beam passing through the first surface; and means for aiding proper focusing of the optical beam of an optical disc device on the first surface, the means externally exposed at the first surface when the optical beam is writing to the first surface.

19. The optical disc of claim 18, wherein the means comprises a spacer fixably attached to the optical disc on one of the first surface and the second surface.

20. The optical disc of claim 18, wherein the means comprises a removable spacer for the optical disc device.

21. The optical disc of claim 18, wherein the means is part of the optical disc device and moves an objective lens of the optical disc device.

22. The optical disc of claim 18, wherein the first optically writable surface comprises an optically writable label surface on which the optical beam is permitted to properly focus by the means, and the second optically writable surface comprises an optically writable data surface on which the optical beam is normally focused.

23. The optical disc of claim 18, wherein the means comprises a spacer on the first surface having a thickness calibrated to aid proper focusing of the optical beam on the first surface, the spacer effectively offsetting an objective lens of the optical disc device through which the optical beam is focused by a distance equal to the thickness of the spacer.

24. An optical disc device comprising:

an optically writable label surface;

an optically writable data surface opposite to the optically writable label surface, the label surface adapted to be written to with an optical beam without the beam passing through the data surface, and the data surface adapted to be written to with the optical beam without the beam passing through the label surface;

a spacer on the optically writable label surface and having a thickness to effectively offset an objective lens of an optical disc device when focusing the optical beam of the optical disc device on the optically writable label surface, the spacer externally exposed at the label surface when the optical beam is writing to the label surface.

25. The optical disc of claim 24, wherein the spacer permits the optical beam to properly focus on the optically writable label surface, the optical beam normally focused on the optically writable data surface.

26. A method comprising:

for writing to a first optically writable surface of an optical disc with a spacer externally exposed at the first optically writable surface when an optical beam is writing to the first surface, placing the optical disc relative to an optical disc device such that the optical beam of the optical disc device is incident to the first optically writable surface, the optical beam writing to the first optically writable surface without the beam passing through a second optically writable surface of the optical disc; and, for writing to the second optically writable surface of the optical disc without a spacer, placing the optical disc relative to the optical disc device such that the optical beam is incident to the second optically writable surface, the optical beam writing to the second optically writable surface without the beam passing through the first optically writable surface.

27. The method of claim 26, wherein the first optically writable surface comprises an optically writable label surface, and the second optically writable surface comprises an optically writable data surface.

28. A method comprising:

providing oppositely situated optically writable surfaces on an optical disc, a first surface of the optically writable surfaces optically written to with an optical beam without the beam passing through a second surface of the optically writable surfaces, and the second surface optically written to with the optical beam without the beam passing through the first surface; and, providing a spacer on and externally exposed at one surface of the oppositely situated surfaces when the optical beam is writing to the one surface to aid proper focusing of the optical beam of an optical disc device on the one surface.

29. The method of claim 28, wherein providing the oppositely situated optically writable surfaces comprises providing an optically writable label surface opposite to an optically writable data surface.

30. The method of claim 29, wherein providing the spacer comprises providing the spacer on the optically writable label surface to aid proper focusing of the optical beam on the optically writable label surface.

31. An optical disc device comprising:
   an optical beam generator to generate an optical beam;
   an objective lens to focus the optical beam;
   a loading mechanism receptive to an optical disc having a first optically writable surface oppositely situate to a second optically writable surface such that one surface of the first and the second surfaces of the optical disc is incident to the optical beam, where the first surface is optically written to with the optical beam without the beam passing through the second surface, and the second surface is optically written to with the optical beam without the beam passing through the first surface;
   a spindle to rotate the optical disc for at least optically writing to the one surface of the optical disc incident to the optical beam; and,
   a removable spacer for use when the one surface of the optical disc incident to the optical beam is the first surface of the optical disc, the removable space externally exposed at the first surface when the optical beam is writing to the first surface.

32. The optical disc device of claim 31, wherein the removable spacer is removably attachable to one of the loading mechanism and the spindle.

33. The optical disc device of claim 31, wherein the removable spacer permits the optical beam to properly focus through the objective lens on the one surface of the optical disc, when the one surface is the first surface of the optical disc.

34. The optical disc device of claim 31, wherein the removable spacer effectively offsets the one surface of the optical disc, when the one surface is the first surface of the optical disc, relative to the objective lens.

35. The optical disc device of claim 31, wherein the removable spacer has a thickness calibrated to aid proper focusing of the optical beam through the objective lens on the one surface of the optical disc, when the one surface is the first surface of the optical disc.

36. The optical disc device of claim 31, wherein the removable spacer permits the optical beam to focus through the objective lens at least approximately at a 42 micron diameter spot on the one surface of the optical disc, when the one surface is the first surface of the optical disc.

37. The optical disc device of claim 31, wherein the optical beam normally properly focuses through the objective lens on the one surface of the optical disc, when the one surface is the second surface of the optical disc.

38. The optical disc device of claim 31, wherein the first surface of the optical disc comprises an optically writable label surface, and the second surface of the optical disc comprises an optically writable data surface.

39. A removable spacer for an optical disc device comprising:
   a mechanism to removably place the spacer within the optical disc device; and,
   a part having a thickness to effectively offset an objective lens of the optical disc device relative to a currently in-use surface of oppositely situated optically writable surfaces of an optical disc within the optical disc device,
   wherein the removable spacer is externally exposed at the currently in-use surface when the optical beam is optically writing to the currently in-use surface, and
   wherein a first surface of the optically writable surfaces is written to with the optical beam of the optical disc drive without the beam passing through a second surface of the optically writable surfaces, and the second surface is written to with the optical beam without the beam passing through the first surface.

40. The removable spacer of claim 39, wherein the mechanism removably attaches the spacer within the optical disc device.

41. The removable spacer of claim 39, wherein the mechanism is for removable placement to one of a loading mechanism and a spindle of the optical disc device.

42. The removable spacer of claim 39, wherein the mechanism is for removable placement within the optical disc device when the currently in-use surface is an optically writable label surface of the surfaces of the optical disc within the device.

43. The removable spacer of claim 39, wherein the mechanism is for removable placement within the optical disc device when the currently in-use surface is an optically writable data surface of the surfaces of the optical disc within the device.

44. The removable spacer of claim 39, wherein effectively offsetting the objective lens aids proper focusing of an optical beam of the optical disc device focused through the objective lens on the currently in-use surface of the optical disc.

* * * * *

UNITED STATES PATENT AND TRADEMARK OFFICE
CERTIFICATE OF CORRECTION

PATENT NO.        : 7,103,896 B2                                          Page 1 of 1
APPLICATION NO.   : 10/339705
DATED             : September 5, 2006
INVENTOR(S)       : Michael A Pate et al.

It is certified that error appears in the above-identified patent and that said Letters Patent is hereby corrected as shown below:

In column 10, line 48, in Claim 1, delete "surfaces," and insert -- surfaces; --, therefor.

Signed and Sealed this

Twenty-third Day of June, 2009

JOHN DOLL
*Acting Director of the United States Patent and Trademark Office*